UNITED STATES PATENT OFFICE.

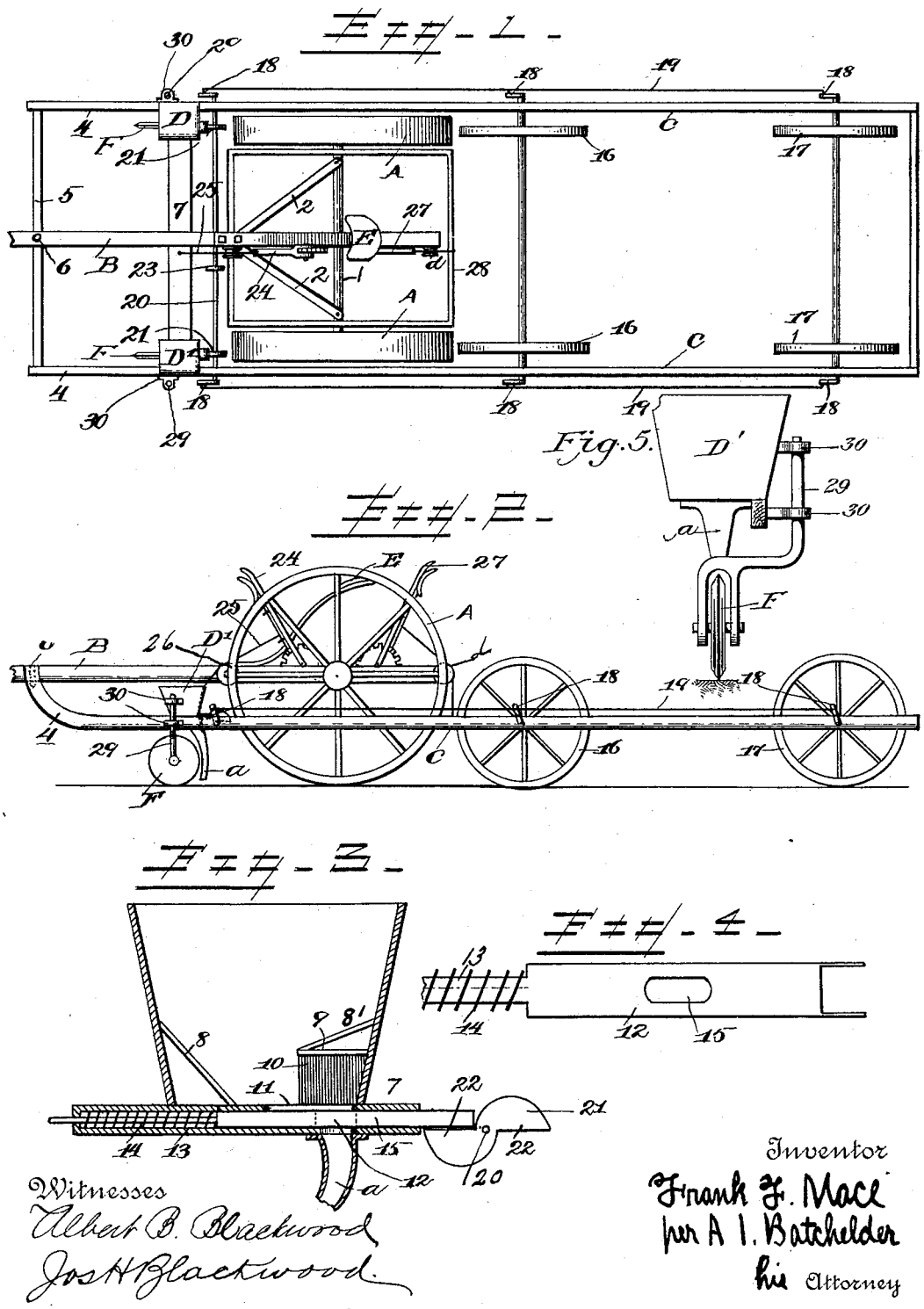

FRANK F. MACE, OF SIOUX CITY, IOWA.

CORN-PLANTER.

SPECIFICATION forming part of Letters Patent No. 452,411, dated May 19, 1891.

Application filed November 18, 1890. Serial No. 371,871. (No model.)

*To all whom it may concern:*

Be it known that I, FRANK F. MACE, a citizen of the United States, residing at Sioux City, in the county of Woodbury and State of Iowa, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to corn-planting machines of that class organized and adapted to deposit the seed in parallel rows at determined distances in the rows, and the object is to provide a machine for the purposes intended which will answer all the purposes of a "check-row" planter without being encumbered by the necessary fixtures or mechanism associated with check-row planters.

My invention therefore consists in the novel construction of parts and their combination, as will be hereinafter fully described, and particularly pointed out in the claims.

I have fully and clearly illustrated my invention in the accompanying drawings, wherein—

Figure 1 is a plan view of my improved corn-planter. Fig. 2 is a side view of the same. Fig. 3 is a transverse vertical sectional view of the seed-boxes. Fig. 4 is a detail of the seed-slide. Fig. 5 is a front view of one of the seed-boxes and furrow-opening disk.

Referring now to these illustrations, wherein like parts are designated by the same notations or references, A designates the supporting-wheel, having a broad tire constituting a covering-surface when passing over the dropped seeds. These wheels carry an axle 1, on the spindles of which the wheels revolve.

B designates the tongue of the corn-planter, provided with hounds 2, the rear ends of which are fixed to the axle. The tongue is extended rearwardly over the axle and beyond the same, substantially as shown in the drawings, and serves the purposes hereinafter specifically set forth.

C designates a rectangular frame mounted upon the power or driving wheels 16 and 17 of the seed mechanism, the side rails of which are connected at the rear by a cross-piece, substantially as shown. The front ends of the side rails of this frame are directed upward, as seen at 4, and connected by a cross rail or bar 5, hinged or jointed to the tongue at 6, so that the frame may be lifted when it becomes necessary in transportation to and from the field, or when it becomes necessary to pass it over obstructions in the field.

D D' designate the seed-boxes, which are of the usual construction, mounted on cross-pieces 7, secured on the frame and provided with inclined bottom pieces 8 and 8' and horizontal bottom pieces 9, having a seed-opening between, and under the latter of which is secured a brush 10, which sweeps over the seed-aperture in the seed-slide and removes the superfluous seed. In the bottom of each box is formed a way 11, in which is disposed the dropping-slide 12. This slide consists of a flat plate of suitable material, having a stem 13 at its forward portion, about which or on which is arranged a spring 14, the force of which throws the slide backward with its aperture 15 over the seed-spout $a$, depending from the bottom of the seed-box.

16 17 designate the power-wheels, mounted on axles journaled in the rectangular frame and provided with crank-arms 18, connected by a connecting-rod 19. These wheels are made of a determined circumference, one-half of which measures the distance between the point at which the corn is to be dropped—that is, one revolution of the wheel measures two hills of corn.

On the frame at the rear of the seed-box is mounted a shaft 20, carrying cams 21, the faces or steps 22 of which bear against the projecting ends of the seed-slides of the seed-boxes and operate to push those elements forward with their seed-apertures under the contents of the seed-boxes and permit a certain number of seeds to be deposited in the pit formed by the aperture and the bottom of the way, in advance of the opening and the spouts. These cams are formed with steps 22, which in the course of the revolution of the cam 21 forces the slide forward, and the force of the spring 14 on the stem of the seed-slide 13 will be brought into requisition and the slides be forced rearward when the steps 21 have slipped by, conveying with them the seeds which may have found their way into the aperture of the slides, to be carried rearward from the opening into the spout and deposited in the furrow formed by the disk F, arranged immediately in advance of the seed-spouts. On the shaft 20 is secured a hand-wheel 23, which is used to arrange or adjust the machine to accomplish its first deposit of seed. The operator, having set the machine at the end of the row, turns this shaft with the frame C lifted from the ground, until the seeds are deposited at that end of the row, which being accomplished the frame is lowered and the planting may be proceeded with in regular order. The revolutions of the driving mechanism determine the distance at which subsequent deposits of seed are made.

E designates a seat, mounted on the tongue, secured in the usual or any preferred way. On the tongue is fulcrumed a lever 24, having a catch, which engages a segment-rack fixed on the tongue, to hold the lever in any adjusted position. To this lever is attached a cable or chain 25, leading down over a sheave 26, mounted on the tongue, and the lower end of the chain being attached to the cross-piece 7, connecting the seed-boxes, or to a bar extending across and between the side pieces of the frame specially provided for that purpose. By means of this lever the frame C may be lifted by a single movement, or, if additional leverage is required for this purpose, a lever 27 may be mounted on the rearward extending portion of the tongue identical in construction to the lever 24, except that its cable is carried down over a sheave d rearward of the tongue, and the end of the cable attached to the cross-bar 28, mounted across the frame, substantially as shown.

F designates a disk constituting the furrow-maker in which the seeds are deposited. This disk is journaled on a standard 29, adjustably held in the keeper 30, secured to the frame. This furrow-maker F is arranged immediately in advance of and on a line with the seed-spout, leading from the seed-box so that the seed may be deposited with a certainty in the furrow or opening formed by the disk to receive them.

The operation is as follows: the machine being adjusted, as heretofore specified, to deposit the seeds for the first hills of the row through the instrumentalities of the hand-wheel on the cam-shaft, the machine is now ready to commence operations of planting continuously throughout any distance desired. As the corn-planter progresses across the field, the cams are rotated by their connections with the power-wheel and eventuate in pushing the seed-slides forward in the seed-boxes until the step of the cam is reached, when the force of the springs pushes back the slides, carrying with them the seeds that may have found their way into the apertures of the slides until the apertures register with the seed-spouts, when the seeds are deposited in the furrow formed by the disks. A repetition of these movements results in depositing the requisite number of seeds at determined distances as long as the machine is operated. At any time when it becomes necessary to carry the frame with its mechanism from obstructions, or during transportation, the frame may be lifted by the levers to suit the exigency.

Having thus described my invention, what I claim, and desire to secure by Letters Patent, is—

1. In a corn-planter, the combination, with covering-wheels A, their axle, and the tongue B, of the rectangular frame C, jointed at its front end to the tongue, the power-wheels 16 17, mounted on axles provided with crank-arms, the connecting-rod uniting the outer ends of the crank-arms, the shaft mounted at the rear of the seed-boxes, having a crank-arm connected to the connecting-rod of the power-wheels, cams mounted on the last-named shaft, seed-boxes provided with seed-slides, arranged to be actuated by cams in one direction, springs in the seed-slides moving them in opposite directions, and furrow-opening disks journaled on the rectangular frame in advance of the dropping-spouts of the seed-boxes, all substantially as described.

2. In a corn-planting machine, the combination, with the covering-wheels and the tongue of the machine, of a rectangular frame hinged at its front end to the tongue, power-wheels mounted on shafts carrying the after part of the machine, said shafts being provided with crank-arms, connecting-rods uniting said crank-arms, a shaft mounted at the forward part of the frame immediately behind the seed-boxes, cams on said shaft actuated by the connecting-rods and the power-wheels, seed-boxes mounted on the frame, slides in the bottoms of said seed-boxes arranged with their ends to bear against the faces of the cam, and means, substantially as described, for making the furrows to receive the seeds, all substantially as set forth.

In testimony whereof I affix my signature in presence of two witnesses.

FRANK F. MACE.

Witnesses:
H. T. TIFFANY,
J. N. WARREN.